(12) United States Patent
Choi (10) Patent No.: US 11,368,333 B1
(45) Date of Patent: Jun. 21, 2022

(54) MOBILE MUX

(71) Applicant: Curvalux UK Limited, Sheffield (GB)

(72) Inventor: Thomas Kyo Choi, Los Angeles, CA (US)

(73) Assignee: Curvalux UK Limited, Sheffield (GB)

(*) Notice: Subject to any disclaimer, the term of this patent is extended or adjusted under 35 U.S.C. 154(b) by 3 days.

(21) Appl. No.: 17/248,276

(22) Filed: Jan. 18, 2021

(51) Int. Cl.
| | | |
|---|---|---|
| H04W 40/24 | (2009.01) | |
| H04L 12/44 | (2006.01) | |
| H04W 84/04 | (2009.01) | |
| H04W 88/08 | (2009.01) | |

(52) U.S. Cl.
CPC ........... *H04L 12/44* (2013.01); *H04W 84/047* (2013.01); *H04W 88/08* (2013.01)

(58) Field of Classification Search
CPC ..... H04W 40/24; H04W 72/04; H04W 40/22; H04W 40/242; H04W 40/248; H04W 50/46; H04W 88/04; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | | |
|---|---|---|---|---|
| 2006/0280131 A1* | 12/2006 | Rahman | .................. | H04L 45/02 370/256 |
| 2007/0211703 A1* | 9/2007 | Gu | ...................... | H04L 12/1818 370/356 |
| 2008/0268855 A1* | 10/2008 | Hanuni | ............... | H04L 41/0896 455/445 |
| 2009/0196277 A1* | 8/2009 | Horn | ..................... | H04J 3/0679 370/350 |
| 2010/0110935 A1* | 5/2010 | Tamassia | ............ | H04L 67/1065 370/256 |
| 2013/0094404 A1* | 4/2013 | Van Wyk | ................ | H04L 45/48 370/256 |
| 2015/0071121 A1* | 3/2015 | Patil | ........................ | H04L 67/16 370/255 |
| 2017/0329824 A1* | 11/2017 | Hu | ........................ | G06F 9/5066 |

* cited by examiner

*Primary Examiner* — Jung Liu
(74) *Attorney, Agent, or Firm* — S&F/WEHRW (57) ABSTRACT

A mobile mux is a radio communication network (RCN) in which base stations (BS's) networked in a tree topology connect a core network (CN) to user equipments (UEs) by installing a backhaul link at a root BS and having non-root BS's wirelessly communicable with the root BS such that all UEs access the CN without a first burden of installing multiple independent backhaul links for all BS's. The frequency resource allocated to the RCN for communicating with the UEs is reused in inter-BS communication, avoiding a second burden of acquiring an additional frequency resource. Avoiding the two burdens enables faster roll-out of communication services. Furthermore, uplink and downlink data traffics between the CN and the UEs are aggregated and received, respectively, at the root BS, allowing a capacity provided by the single backhaul link to be less than a sum of capacities estimated for the independent links.

13 Claims, 6 Drawing Sheets

MOBILE MUX

LIST OF ABBREVIATIONS

BS Base station
CN Core network
FDD Frequency division duplexing
FDM Frequency division multiplexing
FR1 Frequency Range 1
FR2 Frequency Range 2
RCN Radio communication network
TDD Time division duplexing
TDM Time division multiplexing
UE User equipment

FIELD OF THE INVENTION

The present disclosure generally relates to mobile communications. In particular, the present disclosure relates to a RCN used in mobile communications for various advantages including faster roll-out of communication services, increasing a network capacity and reducing an implementation cost. The RCN is a mobile mux.

BACKGROUND

Quick roll-out of communication services in newly-developing geographical regions or new communication services in existing areas is of paramount commercial importance in running a mobile communication system. With a foreseeable explosive growth of Internet data consumption, there is an ever increasing demand on network capacity. To increase the network capacity, one approach is to install more BS's. Since each BS is required to connect to a CN, a backhaul communication link supporting high-rate data transmission is required to be installed at each BS. With an increasing number of BS's required to install with an individual backhaul communication link, it is possible to take a long time and incur a high cost to install a large number of backhaul communication links, thereby delaying the roll-out of communication services. It is desirable to establish a network of BS's with advantages of reduced implementation cost, increased capacity, and enabling the network to quickly roll out communication services.

Figure 1:
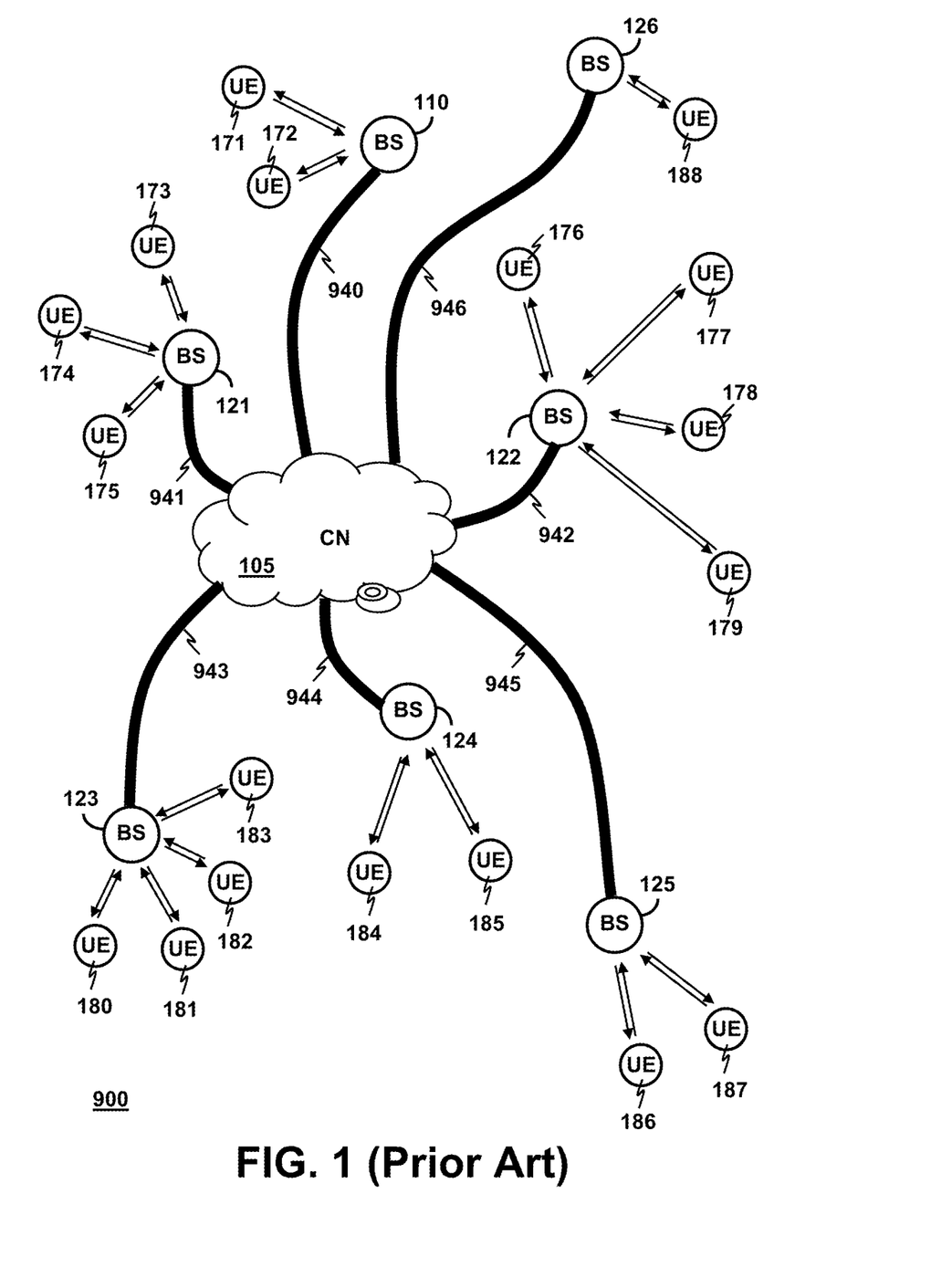
FIG. 1 depicts a conventional network for connecting a plurality of BS's to a CN, where it is required to install multiple independent wired backhaul link from the CN to all the BS's.

The technical problems that are faced in achieving the aforementioned advantages are illustrated as follows with the aid of FIG. 1, which depicts a conventional network 900 for connecting BS's 110, 121-126 to a CN 105.

In the conventional network 900, it is required to install multiple independent wired backhaul links 940-946 for connecting the BS's 110, 121-126, respectively, to the CN 105. Each of the links 940-946 is usually implemented as an optical-fiber link. The need to install these multiple links 940-946 delays roll-out of communication services provided by the network 900. In addition, the installation cost of each optical fiber is not low, especially if it is required to install the optical fiber over a long distance such as in linking the CN 105 to BS's located in remote rural areas. Apart from the installation cost, installing the links 940-946 also adds costs in renting lands, estates and building spaces for laying the optical fibers. Clearly, it is desirable if the number of wired backhaul links to be installed can be minimized.

The BS's 110, 121-126 are intended for communicating with a first plurality of UEs 171-188. In practical situations, the geographical distribution of the UEs 171-188 is often non-uniform and time-varying over the network 900. Although the BS 126 only serves one UE 188 as shown in FIG. 1, the number of UEs to be served in some time later is uncertain. Therefore, the wired backhaul link 946 is not designed to provide a data-traffic capacity that matches a data-traffic demand estimated from statistics obtained at some time moments, but is designed to provide an overestimated capacity as a safeguard to keep user satisfaction. It leads to an increased installation cost, and a frequent wastage of capacity provided by the wired backhaul link 946. Potentially, it also leads to a longer installation time, delaying the roll-out of communication services provided by the network 900.

In mobile communication, there is a trend that multiple operators are involved in running the network 900. A practical scenario is that a dominant operator runs a large part of network infrastructure and plural local operators operates BS's functioning as edge nodes to serve UEs at hotspots (e.g., the BS's 125, 126). Each of the local operators may be allocated with a limited frequency spectrum for addressing specific needs of local UEs. In the network 900, it is possible that different BS's are operated under different allocated frequency spectra. For example, the BS 123 is allowed to communicate with UEs 180-183 under a first frequency band, and the BS 126 is operated under a second frequency band different from the first one. In a conventional approach of setting up the network 900, all the BS's 110, 121-126 are implemented with the same configuration that supports communication with UEs over the entire range of frequency spectra (viz., supporting communication at least over both the first and second frequency bands in the last-mentioned example.) It adds implementation costs of BS's, especially when it is required to install a lot of BS's in the network 900.

There is a need in the art to have a technique for establishing a network of BS's with advantages of reduced implementation cost, increased capacity while enabling the network to quickly roll out communication services.

SUMMARY OF THE INVENTION

A first aspect of the present disclosure is to provide a RCN for connecting a CN to a first plurality of UEs. The RCN is referred to as a mobile mux. The RCN is allocated with a frequency resource consisting of a plurality of frequency spectra used for communication with the first plurality of UEs.

The RCN comprises a plurality of BS's for communicating with the first plurality of UEs. Respective BS's in the plurality of BS's are networked in a tree topology with a root BS selected from the plurality of BS's. It follows that the plurality of BS's is partitioned into the root BS and a plurality of non-root BS's. The root BS is connected to a wired backhaul link for connecting to the CN. An individual non-root BS is used for communicating with a second plurality of UEs reachable by the individual non-root BS. The second plurality of UEs is selected from the first plurality of UEs. The individual non-root BS is wirelessly communicable with the root BS directly, or indirectly via a route including at least one other non-root BS in between, to enable the second plurality of UEs to connect to the CN. It allows the first plurality of UEs to access the CN and vice versa through communicating with the plurality of BS's and utilizing the wired backhaul link without a first burden of installing multiple independent wired backhaul links at all respective BS's in the plurality of BS's, thereby reducing a time taken in constructing the RCN before operating the RCN. In addition, the plurality of BS's is configured such that uplink data traffics generated from the first plurality of UEs for delivering to the CN are aggregated at the root BS for transmission on the wired backhaul link and such that downlink data traffics sent from the CN for delivering to the first plurality of UEs are received at the root BS before distribution to the first plurality of UEs, allowing a data-traffic capacity provided by the wired backhaul link to be less than a sum of individual capacities that are respectively estimated for the independent wired backhaul links.

Preferably, the frequency resource is reused in inter-BS communication, avoiding a second burden of acquiring an additional frequency resource before operating the RCN. Advantageously, avoidance of the first and second burdens altogether enables faster roll-out of communication services provided by the RCN.

In the RCN, the individual non-root BS has a parent BS and a plurality of daughter nodes. The plurality of daughter nodes is formed by augmenting the second plurality of UEs and an entirety of any daughter BS. In the tree topology, an individual daughter BS is connected to the individual non-root BS and is farther away from the root BS than the individual non-root BS is. Also in the tree topology, the parent BS is connected to the individual non-root BS and is nearer to the root BS than the individual non-root BS is. In the RCN, the root BS has a corresponding plurality of daughter nodes.

In certain embodiments, a first portion of the frequency resource is used for communicating between the individual non-root BS and the second plurality of UEs, and a second portion of the frequency resource not overlapping with the first portion thereof is used for communicating between the individual non-root BS and the entirety of any daughter BS or between the individual non-root BS and the parent BS. As a result, it reuses a part of frequency resource not used in communication between the individual non-root BS and the second plurality of UEs for enhancing an overall capacity supportable by the individual non-root BS while supporting faster roll-out of the communication services provided by the RCN.

In certain embodiments, the first portion of the frequency resource is used for communicating between the individual non-root BS and the second plurality of UEs. The individual non-root BS is configured to: receive a plurality of first uplink signals from the plurality of daughter nodes, an individual first uplink signal having a first carrier frequency; generate a second uplink signal having a second carrier frequency for transmission to the parent BS by frequency-translating the individual first uplink signal and aggregating the plurality of first uplink signals after frequency translation; receive a first downlink signal from the parent BS, the first downlink signal having a third carrier frequency, wherein a baseband component of the first downlink signal is obtained by multiplexing the plurality of first baseband signals; and generate a plurality of second downlink signals for transmission to the plurality of daughter nodes by deaggregating the first downlink signal, wherein a corresponding second downlink signal for transmission to the individual daughter node is generated by frequency-translating the first downlink signal to a fourth carrier frequency of the corresponding second downlink signal followed by filtering. Advantageously, the individual non-root BS is installed with a first baseband-processing facility compliant to a first communication standard used for communication with any UE over the first portion of the frequency resource. Using frequency translation in generating the second uplink signal and the corresponding second downlink signal avoids a need for the individual non-root BS to install with a second baseband-processing facility compliant to a second communication standard used for communication with any UE over a second portion of the frequency resource not overlapping with the first portion thereof even if the first, second, third or fourth carrier frequency is outside the first portion of the frequency resource. The second uplink signal may be generated as a multicarrier signal having a frequency spectrum selectable to be contiguous or non-contiguous for enabling the frequency resource to be more efficiently used.

In certain embodiments, the individual non-root BS is located in the RCN at a geographical location selected such that a propagation characteristic of a radio channel between the individual non-root BS and an individual UE in the second plurality of UEs favors the first portion of the frequency resource over the second portion thereof.

In certain embodiments, the individual non-root BS is configured to: receive a plurality of first uplink signals from the plurality of daughter nodes; generate a second uplink signal, wherein a baseband component of the second uplink signal is formed by multiplexing baseband components of the plurality of first uplink signals, thereby allowing the second uplink signal to be generated without a need to decode payload data therein for reducing an implementation cost of the individual non-root BS; and transmit the second uplink signal to a parent BS, wherein in the tree topology, the parent BS is connected to the individual non-root BS and is nearer to the root BS than the individual non-root BS is.

In certain embodiments, the parent BS is configured to: obtain a plurality of first baseband signals for transmission to the plurality of daughter nodes; generate a first downlink signal, wherein a baseband component of the first downlink signal is obtained by multiplexing the plurality of first baseband signals; and transmit the first downlink signal to the individual non-root BS. The individual non-root BS is further configured to: receive the first downlink signal; extract the plurality of first baseband signals from the first downlink signal; generate a plurality of second downlink signals for transmission to the plurality of daughter nodes, wherein a corresponding second downlink signal for transmission to the individual daughter node has a baseband component that is a corresponding first baseband signal for transmission to the individual daughter node, thereby allowing the corresponding second downlink signal to be generated without a need to decode payload data therein for reducing the implementation cost of the individual non-root BS; and transmit the corresponding second downlink signal to the individual daughter node.

Preferably, an individual BS in the plurality of BS's comprises an antenna array for adaptive beamforming. The individual BS is configured as follows. During receiving an uplink signal from an individual daughter node in a corresponding plurality of daughter nodes communicated with the individual BS, the individual BS configures the antenna array to point to an arrival direction of the uplink signal, thereby allowing spatial multiplexing of respective uplink signals generated by the corresponding plurality of daughter nodes to be achieved for enhancing a data-traffic capacity supportable by the individual BS.

Preferably, the individual BS is further configured as follows. During transmitting a downlink signal to the individual daughter node, the individual BS configures the antenna array to point to the arrival direction of the uplink signal for reducing interference made to another daughter node neighboring to the individual daughter node.

In certain embodiments, the individual non-root BS further comprises a directional antenna for communication with a corresponding parent BS communicated with the individual non-root BS.

The root BS is further configured to directly communicate with a third plurality of UEs, wherein the third plurality of UEs is selected from the first plurality of UEs.

A second aspect of the present disclosure is to provide a method for setting up and operating a RCN used for connecting a CN to a first plurality of UEs. The RCN is allocated with a frequency resource consisting of a plurality of frequency spectra used for communication with the first plurality of UEs. The RCN comprises a plurality of BS's for communicating with the first plurality of UEs. Respective BS's in the plurality of BS's are networked in a tree topology with a root BS selected from the plurality of BS's. It follows that the plurality of BS's is partitioned into the root BS and a plurality of non-root BS's.

The method comprises: arranging respective BS's in the plurality of BS's to network in a tree topology with a root BS selected from the plurality of BS's, the plurality of BS's being partitioned into the root BS and a plurality of non-root BS's; connecting the root BS to a wired backhaul link that connects to the CN; using an individual non-root BS to communicate with a second plurality of UEs reachable by the individual non-root BS, the second plurality of UEs being selected from the first plurality of UEs; configuring the individual non-root BS to wirelessly communicate with the root BS directly, or indirectly via a route including at least one other non-root BS in between, to enable the second plurality of UEs to connect to the CN such that the first plurality of UEs is allowed to access the CN and vice versa through communicating with the plurality of BS's and utilizing the wired backhaul link without a first burden of installing plural independent wired backhaul links at all respective BS's in the plurality of BS's, thereby reducing a time taken in constructing the RCN before operating the RCN; and configuring the plurality of BS's such that uplink data traffics generated from the first plurality of UEs for delivering to the CN are aggregated at the root BS for transmission on the wired backhaul link and such that downlink data traffics sent from the CN for delivering to the first plurality of UEs are received at the root BS before distribution to the first plurality of UEs, allowing a data-traffic capacity provided by the wired backhaul link to be less than a sum of individual capacities that are respectively estimated for the independent wired backhaul links.

Preferably, the method further comprises: reusing the frequency resource in inter-BS communication to avoid a second burden of acquiring an additional frequency resource before operating the RCN, whereby avoidance of the first and second burdens altogether enables faster roll-out of communication services provided by the RCN.

The individual non-root BS has a parent BS and a plurality of daughter nodes. The plurality of daughter nodes is formed by augmenting the second plurality of UEs and an entirety of any daughter BS. In the tree topology, an individual daughter BS is connected to the individual non-root BS and is farther away from the root BS than the individual non-root BS is. Also in the tree topology, the parent BS is connected to the individual non-root BS and is nearer to the root BS than the individual non-root BS is.

In certain embodiments, the method further comprises: using a first portion of the frequency resource for communicating between the individual non-root BS and the second plurality of UEs; and using a second portion of the frequency resource not overlapping with the first portion thereof for communicating between the individual non-root BS and the entirety of any daughter BS or between the individual non-root BS and the parent BS, thereby reusing a part of frequency resource not used in communication between the individual non-root BS and the second plurality of UEs for enhancing an overall capacity supportable by the individual non-root BS while supporting faster roll-out of the communication services provided by the RCN.

In certain embodiments, the method further comprises: using the first portion of the frequency resource for communicating between the individual non-root BS and the second plurality of UE; receiving, by the individual non-root BS, a plurality of first uplink signals from the plurality of daughter nodes wherein an individual first uplink signal has a first carrier frequency; generating, by the individual non-root BS, a second uplink signal having a second carrier frequency for transmission to the parent BS by frequency-translating the individual first uplink signal and aggregating the plurality of first uplink signals after frequency translation; receiving, by the individual non-root BS, a first downlink signal from the parent BS, the first downlink signal having a third carrier frequency, wherein a baseband component of the first downlink signal is obtained by multiplexing the plurality of first baseband signals; generating, by the individual non-root BS, a plurality of second downlink signals for transmission to the plurality of daughter nodes by deaggregating the first downlink signal, wherein a corresponding second downlink signal for transmission to the individual daughter node is generated by frequency-translating the first downlink signal to a fourth carrier frequency of the corresponding second downlink signal followed by filtering; and installing the individual non-root BS with a first baseband-processing facility compliant to a first communication standard used for communication with any UE over the first portion of the frequency resource, whereby using frequency translation in generating the second uplink signal and the corresponding second downlink signal avoids a need for the individual non-root BS to install with a second baseband-processing facility compliant to a second communication standard used for communication with any UE over a second portion of the frequency resource not overlapping with the first portion thereof even if the first, second, third or fourth carrier frequency is outside the first portion of the frequency resource. Preferably, the second uplink signal is generated as a multicarrier signal having a frequency spectrum selectable to be contiguous or non-contiguous for enabling the frequency resource to be more efficiently used.

In certain embodiments, the method further comprises: locating the individual non-root BS in the RCN at a geographical location selected such that a propagation characteristic of a radio channel between the individual non-root BS and an individual UE in the second plurality of UEs favors the first portion of the frequency resource over the second portion thereof.

In certain embodiments, the method further comprises: receiving, by the individual non-root BS, a plurality of first uplink signals from the plurality of daughter nodes; generating, by the individual non-root BS, a second uplink signal, wherein a baseband component of the second uplink signal is formed by multiplexing baseband components of the plurality of first uplink signals, thereby allowing the second uplink signal to be generated without a need to decode payload data therein for reducing an implementation cost of the individual non-root BS; and transmitting, by the individual non-root BS, the second uplink signal to a parent BS.

In certain embodiments, the method further comprises: obtaining, by the parent BS, a plurality of first baseband signals for transmission to the plurality of daughter nodes; generating, by the parent BS, a first downlink signal, wherein a baseband component of the first downlink signal is obtained by multiplexing the plurality of first baseband signals; transmitting, by the parent BS, the first downlink signal to the individual non-root BS; receiving, by the individual non-root BS, the first downlink signal; extracting, by the individual non-root BS, the plurality of first baseband signals from the first downlink signal; generating, by the individual non-root BS, a plurality of second downlink signals for transmission to the plurality of daughter nodes, wherein a corresponding second downlink signal for transmission to the individual daughter node has a baseband component that is a corresponding first baseband signal for transmission to the individual daughter node, thereby allowing the corresponding second downlink signal to be generated without a need to decode payload data therein for reducing the implementation cost of the individual non-root BS; and transmitting, by the individual non-root BS, the corresponding second downlink signal to the individual daughter node.

In certain embodiments, the method further comprises: during receiving an uplink signal from an individual daughter node in a corresponding plurality of daughter nodes communicated with the individual BS, configuring, by the individual BS, an antenna array of the individual BS to point to an arrival direction of the uplink signal, thereby allowing spatial multiplexing of respective uplink signals generated by the corresponding plurality of daughter nodes to be achieved for enhancing a data-traffic capacity supportable by the individual BS.

In certain embodiments, the method further comprises: during transmitting a downlink signal to the individual daughter node, configuring, by the individual BS, the antenna array to point to the arrival direction of the uplink signal for reducing interference made to another daughter node neighboring to the individual daughter node.

Preferably, the method further comprises: using the root BS to directly communicate with a third plurality of UEs, wherein the third plurality of UEs is selected from the first plurality of UEs.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

As used herein, "a node" in a certain network is an electronic device attached to the network, and is capable of creating, receiving, or transmitting information over one or more communication channels.

As used herein, "a capacity" is an amount of data traffic that can be handled at any given time unless otherwise stated. Hence, a capacity of a certain network is an amount of data traffic that the network can handle at a given time.

As used herein, "a tree topology" is a topological arrangement of nodes in a network, where the network has a root node and all other nodes in the network are connected to form a hierarchy having a plurality of levels such that (1) the root node is at the highest level, (2) a node at a first level not the highest level is connected to only one node at a second level immediately higher than the first level, (3) the node at the first level may connect to one or more nodes at a third level immediately lower than the first level, or may not connect to any node at the third level, and (4) except the nodes at the second and third levels, the node at the first level does not connect to any node at any other level including the first level. Note that the node at the second level is closer to the root node than the node at the first level is. The node at the second level is herein referred to as "a parent node" of the node at the first level. Similarly, each node at the third level is more remote from the root node than the node at the first level is. An individual node at the third level is herein referred to as "a daughter node" of the node at the first level. "Parent BS" and "daughter BS" of a certain BS are similarly defined.

Meanings of "uplink" and "downlink" as used herein in the specification and appended claims are explained as follows. Consider a first situation that a BS directly communicates with a UE. An uplink is a first communication channel on which a first signal travels from the UE to the BS. A downlink is a second communication channel on which a second signal travels from the BS to the UE. Consider a second situation that a network of nodes is arranged in a tree topology. An uplink is a third communication channel from a certain node to its parent node in the network. A downlink is a fourth communication channel from a certain node to its daughter node in the network.

As used herein, "a baseband-processing facility" is an electronic equipment or a group of interconnected electronic equipments for processing a baseband component of a radio signal. As the baseband component of the signal generally contains payload data, functions of the baseband-processing facility may include extracting the payload data from the baseband component, processing the payload data to accomplish some objectives in a data-processing process, and generating a new baseband signal from the processed payload data. The baseband-processing facility may be coupled with a radio transceiver for receiving the radio signal or transmitting a new radio signal that carries the new baseband signal.

Herein in the specification and appended claims, a frequency spectrum may be contiguous or non-contiguous.

Disclosed herein is a RCN for connecting a CN to a first plurality of UEs via a plurality of BS's. Advantages of the RCN include quickly rolling out communication services as well as a reduced implementation cost and an increased capacity. Also disclosed herein is a corresponding method for setting up and operating the disclosed RCN with the aforementioned advantages. The disclosed RCN is given the name of "mobile mux" in that, as soon be evidenced, techniques of spectrum aggregation and deaggregation are used.

Figure 2:
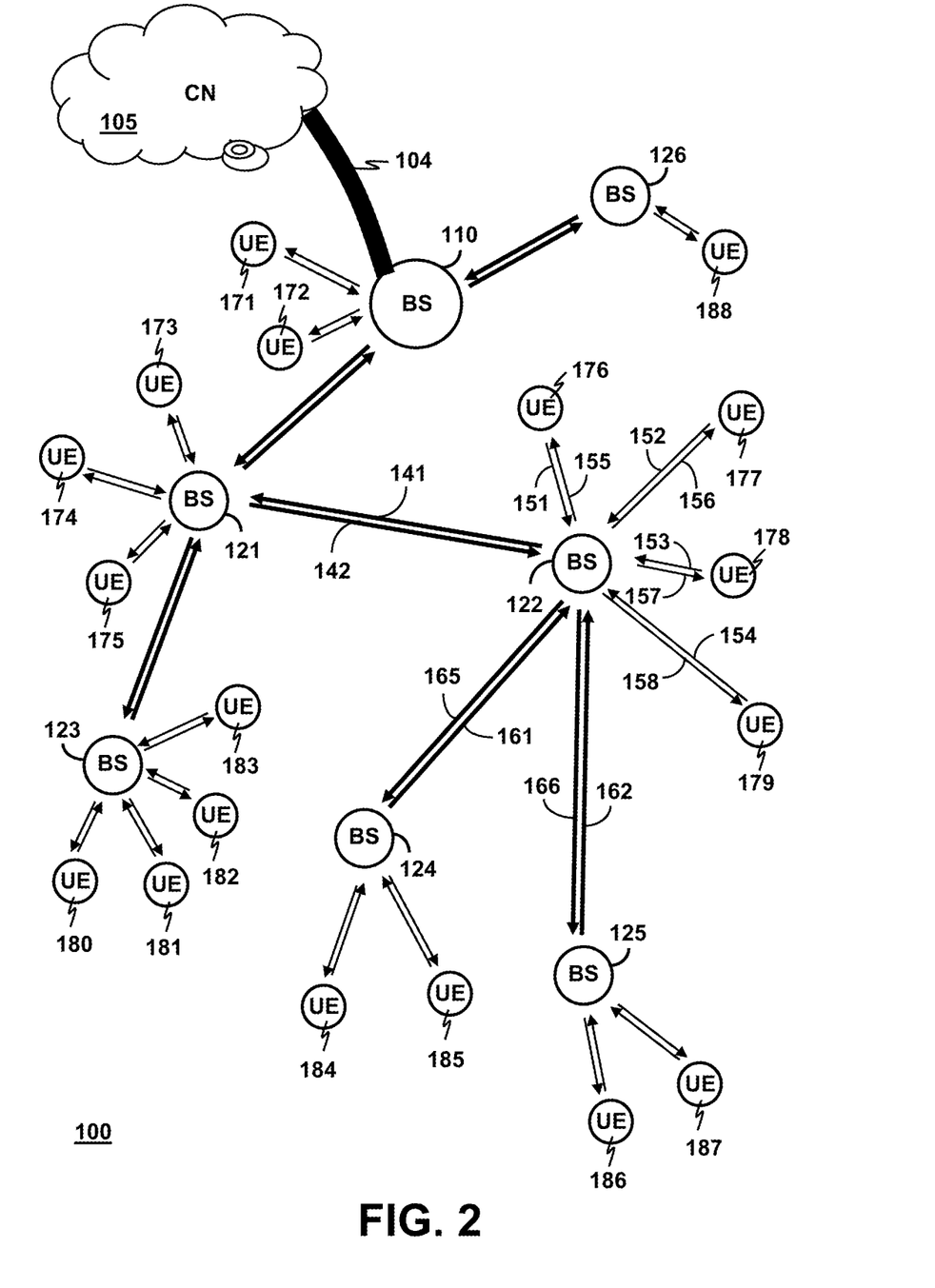
FIG. 2 depicts a RCN for connecting a CN to a first plurality of UEs in accordance with an exemplary embodiment of the present disclosure, where a plurality of BS's is networked in a tree topology for communicating with the first plurality of UEs.

The disclosed RCN is illustrated with the aid of FIG. 2, which depicts an exemplary RCN 100 for connecting the CN 105 to the first plurality of UEs 171-188. For comparison purposes, both the RCN 100 and the conventional network 900 are modeled to serve the same set of UEs 171-188 with the same set of BS's 110, 121-126. The key difference between the two networks 100, 900 is in the connection between the CN 105 and each of the BS's 110, 121-126.

The RCN 100 is allocated with a frequency resource consisting of a plurality of frequency spectra used for communication with the first plurality of UEs 171-188. The frequency resource, which is deemed to be a public resource, is usually licensed from a spectrum-management regulator, such as Federal Communications Commission. It is also possible that the frequency resource includes an unlicensed spectrum if the communication standard employed by the first plurality of UEs 171-188 supports using the unlicensed spectrum.

The RCN 100 comprises a plurality of BS's 110, 121-126 networked in a tree topology. In the tree-topology network formed the plurality of BS's 110, 121-126, the root node of the tree-topology network is selected to be the BS 110. The BS 110 is named as a root BS 110, and remaining BS's in the plurality of BS's 110, 121-126, i.e. the BS's 121-126, form a plurality of non-root BS's 121-126.

The root BS 110 is connected to a wired backhaul link 104 for connecting to the CN 105. The wired backhaul link 104, which is used to provide high-speed data transmission with the CN 105, is usually implemented as an optical-fiber link.

In the RCN 100, each of the non-root BS's 121-126 is a radio access node communicating with selected UEs. Some or all of the non-root BS's 121-126 may be configured to provide radio coverages for small cells, e.g., microcells, picocells and femtocells, with an advantage of close proximity to the selected UEs for addressing high-traffic demands thereof. An individual non-root BS is used for communicating with a second plurality of UEs reachable by the individual non-root BS, where the second plurality of UEs is selected from the first plurality of UEs 171-188. For example, a respective second plurality of UEs has the UEs 173-175 for the non-root BS 121; the UEs 176-179 for the non-root BS 122; the UEs 180-183 for the non-root BS 123; the UEs 184, 185 for the non-root BS 124; the UEs 186, 187 for the non-root BS 125, and the UE 188 for the non-root BS 126.

The individual non-root BS has a parent BS and a plurality of daughter nodes. The plurality of daughter nodes is formed by augmenting the second plurality of UEs and an entirety of any daughter BS. In the tree topology, an individual daughter BS is connected to the individual non-root BS and is farther away from the root BS 110 than the individual non-root BS is. The parent BS is connected to the individual non-root BS and is nearer to the root BS 110 than the individual non-root BS is, also in the tree topology. As an example for illustration, consider the non-root BS 122. The parent node of the non-root BS 122 is the non-root BS 121. The plurality of daughter nodes of the non-root BS 122 consists of the non-root BS's 124, 125 (both of which are daughter BS's of the non-root BS 122) and the UEs 176-179. As another example, the parent node of the non-root BS 123 is the non-root BS 121, and the plurality of the daughter nodes of the non-root BS 123 consists of the UEs 180-183. No daughter BS is associated with the non-root BS 123.

The root BS 110 is enabled to directly communicate with a third plurality of UEs 171, 172, where the third plurality of UEs 171, 172 is selected from the first plurality of UEs 171-188. Similarly, the root BS 110 has a plurality of daughter nodes 121, 126, 171, 172.

In the RCN 100, each of the non-root BS's 121-126 is wirelessly communicable with the root BS 110 directly, or indirectly via a route including at least one other non-root BS in between, to enable the corresponding second plurality of UEs to connect to the CN 105. As an illustrative example shown in FIG. 2, each of the non-root BS's 121 and 126 wirelessly communicates with the root BS 110 directly without an aid from any node in between. Each of the non-root BS's 122-125 wirelessly communicates with the root BS 110 indirectly via either the non-root BS 121.

Since each of the non-root BS's 121-126 is wirelessly communicable with the root BS 110 to enable the corresponding second plurality of UEs to connect to the CN 105, it allows the first plurality of UEs 171-188 to access the CN 105 and vice versa through communicating with the plurality of BS's 110, 121-126 and utilizing the single wired backhaul link 104 without a first burden of installing multiple independent wired backhaul links at all the BS's 110, 121-126. (Each of the independent wired backhaul links is intended to serve a corresponding one of the BS's 110, 121-126, so that it is supposed to have a total of seven such links for the example shown in FIG. 2.) Avoiding a need to build the multiple independent wired backhaul links reduces not only a cost of building the RCN 100 but also a time taken in constructing the RCN 100 before operating the RCN 100. Other advantages of eliminating the need to construct independent wired backhaul links for the plurality of non-root BS's 121-126 include reducing a renting cost of renting lands and estates for housing the links, and reducing an operating cost of running the RCN 100 as it is not necessary to operate the links for the plurality of non-root BS's 121-126.

Additionally, the plurality of BS's 110, 121-126 is configured such that (1) uplink data traffics generated from the first plurality of UEs 171-188 for delivering to the CN 105 are aggregated at the root BS 110 for subsequent transmission on the wired backhaul link 104, and (2) downlink data traffics sent from the CN 105 for delivering to the first plurality of UEs 171-188 are also received at the root BS 110 before distribution to the first plurality of UEs 171-188. By this arrangement, it can be shown as follows that a data-traffic capacity required to be provided by the wired backhaul link 104 in the RCN 100 can be set to be lower than a sum of individual capacities each provided by a respective link in the plurality of independent wired backhaul links 940-946 in the conventional network 900 when the RCN 100 and the conventional network 900 are compared.

It can be shown that the average data-traffic demand to be handled by the wired backhaul link 104, $d_{104}$, is given by $d_{104} = d_{110}+d_{121}+d_{122}+d_{123}+d_{124}+d_{125}+d_{126}$ where $d_{110}$, $d_{121}$, $d_{122}$, $d_{123}$, $d_{124}$, $d_{125}$ and $d_{126}$ are respective average data-traffic demands experienced by the BSs 110, 121, 122, 123, 124, 125 and 126. In estimating the capacity to be offered by the link 104 in a design stage, a safety margin for absorbing a sudden increase in data traffics is provided and is determinable from $\sigma_{104}^2$, a variance of data-traffic demand experienced by the link 104. For convenience, denote $\sigma_n^2$ as a variance of data-traffic demand experienced by the UE n or the link n, whichever appropriate. It follows that $\sigma_{104}^2 = \sigma_{110}^2+\sigma_{121}^2+\sigma_{122}^2+\sigma_{123}^2+\sigma_{124}^2+\sigma_{125}^2+\sigma_{126}^2$ only if individual data-traffic demands experienced by the BSs 110, 121-126 are statistically independent. In practice, however, the instantaneous numbers of UEs served by neighboring BS's are often not statistically independent. For example, the UE 185, originally connected to the BS 124 at a certain first time instant, is mobile and is moved to a radio coverage of the BS 125 such that the UE 185 connects to the BS 125 at a second time instant. At the second time instant, the number of UEs served by the BS 125 is increased by one while the number of UEs served by the BS 124 is reduced by one. Hence, $\sigma_{104}^2 \leq \sigma_{110}^2 + \sigma_{121}^2 + \sigma_{122}^2 + \sigma_{123}^2 + \sigma_{124}^2 + \sigma_{125}^2 + \sigma_{126}^2$ for a fixed (estimated) number of UEs in the RCN 100. For the conventional network 900, it can be shown that $\sigma_{940}^2 = \sigma_{110}^2$, $\sigma_{941}^2 = \sigma_{121}^2$, $\sigma_{942}^2 = \sigma_{122}^2$, $\sigma_{943}^2 = \sigma_{123}^2$, $\sigma_{944}^2 = \sigma_{124}^2$, $\sigma_{945}^2 = \sigma_{125}^2$ and $\sigma_{946}^2 = \sigma_{126}^2$. Hence, it gives an advantage that the data-traffic capacity provided by the wired backhaul link 104 is allowed to be less than a sum of individual capacities that are respectively estimated for the independent wired backhaul links 940-946.

As an additional advantage due to the aforementioned advantage, the wired backhaul link 104 in the RCN 100 can be more efficiently utilized than using the multiple links 940-946 in the network 900 in transmission of the same amount of data traffic between the CN 105 and the first plurality of UEs 171-188. It reduces wastage of the capacity offered by the wired backhaul link 104.

Preferably and advantageously, the frequency resource is reused in inter-BS communication for the plurality of BS's 110, 121-126 as another advantageous feature of the RCN 100. It avoids a second burden of acquiring an additional frequency resource before operating the RCN 100. The additional frequency resource is usually acquired from the spectrum-management regulator. Note that acquiring or obtaining a license to use a frequency spectrum from the regulator is generally a time-consuming process. It is also noticed that although an unlicensed spectrum, or an additional unlicensed spectrum if the frequency resource already includes an existing unlicensed spectrum, may be used as the additional frequency resource for establishing inter-BS communication links, such unlicensed spectrum usually has restrictions in signal bandwidth and peak transmitted power. Furthermore, the possibility that unexpected interference from an external source occurs to the communication links necessitates developing an outage-recovery plan. It can be time-consuming to develop. Collectively, avoidance of the first and second burdens altogether enables faster roll-out of communication services provided by the RCN 100.

In reusing the allocated frequency resource for inter-BS communication in the RCN 100, those skilled in the art are required to consider if the frequency spectrum used in communication between a certain non-root BS and its parent BS (abbreviated as the BS-parent frequency spectrum) may overlap with the frequency spectrum used in communication between the non-root BS and the second plurality of UEs (abbreviated as the BS-UE frequency spectrum). As an example for illustration, the parent BS of the non-root BS 122 is the non-root BS 121, and the non-root BS 122 has the second plurality of UEs 176-179. In some situations, e.g., when an individual UE in the second plurality of UEs may appear along a line-of-sight path between the non-root BS and its parent BS, it is reasonable that the BS-parent and BS-UE frequency spectra do not overlap in order to avoid mutual interference. There are also situations that the individual UE does not appear in the line-of-sight path. For instance, the non-root BS is positioned at a top of a lift shaft in a building for communicating with the individual UE in a lift. The BS-parent and BS-UE frequency spectra may overlap.

It is advantageous that the frequency resource is efficiently reused. Preferably, a first portion of the frequency resource is used for communicating between the individual non-root BS and the second plurality of UEs while a second portion of the frequency resource not overlapping with the first portion thereof is used for communicating between the individual non-root BS and the entirety of any daughter BS or between the individual non-root BS and the parent BS. It allows the frequency resource to be more efficiently used by more evenly distributing data traffics in the RCN 100 over the plurality of frequency spectra in the allocated frequency resource. Another advantage is that it reuses a part of frequency resource not used in communication between the individual non-root BS and the second plurality of UEs so as to enhance an overall data-traffic capacity supportable by the individual non-root BS while supporting faster roll-out of the communication services provided by the RCN 100 as a result of reusing the frequency resource. This advantage is particularly useful in practical situations when the first frequency-resource portion is already crowded with data traffics in communicating with the second plurality of UEs. Among different non-root BS's, the first and second frequency-resource portions for one non-root BS may be the same as, or different from, respective first and second frequency-resource portions for another non-root BS.

For illustration, consider the non-root BS 122. The second plurality of UEs 176-179 communicates with the non-root BS 122 on a certain first frequency spectrum in the frequency resource. The first frequency spectrum may be selected for enjoying an advantage that this frequency spectrum is particularly suitable for meeting requirements on radio propagation and data-traffic demands in communication between the second plurality of UEs 176-179 and the non-root BS 122. A second frequency spectrum is then selected for communication with the daughter BS's 124, 125 and the non-root BS 122. The second frequency spectrum may also be used for communication with the parent BS 121 of the non-root BS 122, or a third frequency spectrum may be used. The second or third frequency spectrum is different from the first one. It is also possible that both the second and third frequency spectra are different from the first one. In one example, a millimeter-wave frequency band dedicated for 5G mobile communication is advantageously used as the first frequency spectrum for short-range communication with the second plurality of UEs 176-179 on streets with a demand for a large volume of data traffic. The frequency band around 900 MHz for 4G mobile communication is employed as the second frequency spectrum while another frequency band around 2.1 GHz is used as the third frequency spectrum. In another example, a frequency band at 900 MHz is utilized for superior performance in communicating with the second plurality of UEs 176-179 inside a building. As radio communication between the non-root BS 122 and the parent and daughter BS's 121, 124, 125 are performed outside the building, the second and third frequency spectra are selected to be the same frequency band around 24 GHz for 5G mobile communication.

In a similar way, preferably a third portion of the frequency resource is used for communicating between the root BS 110 and the third plurality of UEs 171, 172 while a fourth portion of the frequency resource not overlapping with the third portion thereof is used for communicating between the root BS 110 and daughter BS's 121, 126 thereof. It allows the frequency resource to be efficiently used as well as a part of frequency resource not used in communication between the root BS 110 and the third plurality of UEs 171, 172 is reused to enhance an overall capacity supportable by the root BS 110. The third portion of the frequency resource may be the same as or different from the first portion thereof. The second portion of the frequency resource may be the same as or different from the fourth portion thereof.

In forthcoming and future mobile communication standards, there is a trend of expanding the frequency range available for use in mobile communications. The entire frequency range usually spans over different frequency regions where one frequency spectrum is often superior to another frequency spectrum in radio propagation over a certain terrain or a certain radio propagation environment. For example, in 5G communications, the available frequency range for communication may be partitioned into FR1 and FR2. A frequency in FR1 is below 6 GHz while FR2 has a frequency of at least 24 GHz. Radio signals in FR1 are more effective than those in FR2 in radio propagation in the presence of obstacles whereas radio signals in FR2 are preferred over FR1 if a high data rate is required. In particular, frequencies in a lower portion of FR1 (e.g., less than 900 MHz) are particularly suitable for indoor radio communication.

Different propagation characteristics among frequency spectra in the frequency resource allocated to the RCN 100 provides a strategy for advantageously assigning different carrier frequencies to different uplink and downlink signals. In setting up the RCN 100, it is preferable to position an individual BS at a geographical location selected such that a propagation characteristic of a radio channel between the individual BS and an individual UE reachable by the individual BS favors a first frequency spectrum over a second one, where the two frequency spectra are selected from the frequency resource. As such, the first and second portions of the frequency resource as defined above may be selected to be the first frequency spectrum and the second frequency spectrum, respectively. For example, if the second plurality of UEs 176-179 reachable by the non-root BS 122 are located inside a building, a sub-1 GHz frequency spectrum in FR1 is more favorable than any frequency spectrum in FR2 for communication between the non-root BS 122 and the second plurality of UEs 176-179. One preferable location for installing the non-root BS 122 is a location at a periphery of the building. Communication between the non-root BS 122 and each of the UEs 176-179 employs carrier frequencies in the sub-1 GHz region of FR1 whereas communication between the non-root BS 122 and the parent BS 121, in the presence of a line-of-sight path, may use carrier frequencies in a millimeter-wave region of FR2.

Figure 3:
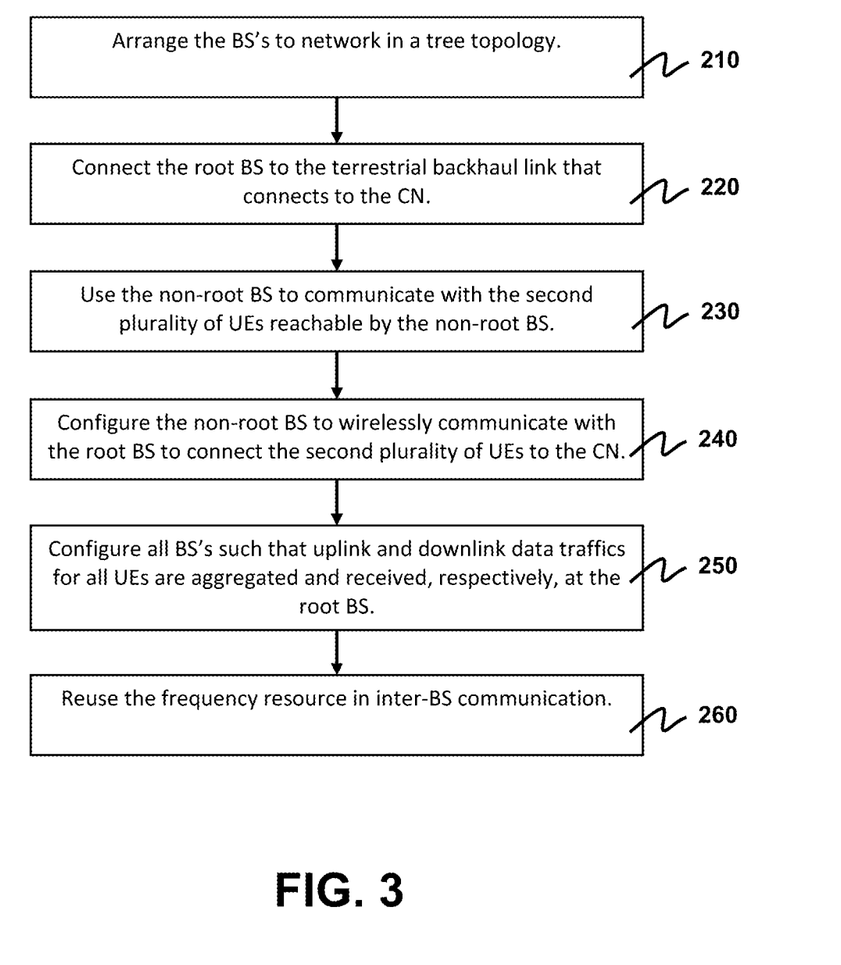
FIG. 3 depicts a flowchart showing exemplary steps of a method for setting up and operating the RCN in accordance with an exemplary embodiment of the present disclosure.

Based on the aforementioned embodiments of the RCN 100, the disclosed method for setting up and operating the RCN 100 is elaborated as follows. FIG. 3 depicts a flowchart showing exemplary steps of the disclosed method. In a step 210, arrange the plurality of BS's 110, 121-126 to network in a tree topology with a root BS (i.e. the BS 110) selected from the plurality of BS's 110, 121-126. The plurality of BS's 110, 121-126 is partitioned into the root BS 110 and the plurality of non-root BS's 121-126. In a step 220, connect the root BS 110 to the wired backhaul link 104, which connects to the CN 105. In a step 230, use an individual non-root BS (i.e. each of the non-root BS's 121-126) to communicate with a second plurality of UEs reachable by the individual non-root BS. The second plurality of UEs is selected from the first plurality of UEs 171-188. Different cases of the second plurality of UEs for the individual non-root BS are mentioned above. In a step 240, configure the individual non-root BS to wirelessly communicate with the root BS 110 to enable the second plurality of UEs to connect to the CN 105 such that the first plurality of UEs 171-188 is allowed to access the CN 105 and vice versa through communicating with the plurality of BS's 110, 121-126 and utilizing the wired backhaul link 104 without the first burden of installing plural independent wired backhaul links at all respective BS's 110, 121-126. It thereby reduces a time taken in constructing the RCN 100 before operating the RCN 100. Note that the individual non-root BS wirelessly communicates with the root BS 110 directly, or indirectly via a route including at least one other non-root BS in between. In a step 250, configure the plurality of BS's 110, 121-126 such that uplink data traffics generated from the first plurality of UEs 171-188 for delivering to the CN 105 are aggregated at the root BS 110 for transmission on the wired backhaul link 104 and such that downlink data traffics sent from the CN 105 for delivering to the first plurality of UEs 171-188 are received at the root BS 110 before distribution to the first plurality of UEs 171-188. As a result, it allows a data-traffic capacity provided by the wired backhaul link 104 to be less than a sum of individual capacities each estimated for an individual independent wired backhaul link installed at one of the BS's 110, 121-126.

Preferably, in a step 260, the frequency resource is reused in inter-BS communication for the plurality of BS's 110, 121-126 to avoid the second burden of acquiring an additional frequency resource before operating the RCN 100. As mentioned above, avoidance of the first and second burdens altogether enables faster roll-out of communication services provided by the RCN 100.

Preferably, in the step 260, a first portion of the frequency resource for communicating between the individual non-root BS and the second plurality of UEs is used. A second portion of the frequency resource not overlapping with the first portion thereof is employed for communicating between the individual non-root BS and the entirety of any daughter BS and between the individual non-root BS and the parent BS. It thereby allows the frequency resource to be efficiently used as well as maintaining a data-traffic capacity intended to be offered to the second plurality of UEs via an exclusive use of the first portion of the frequency resource.

The root BS 110 is further configured to directly communicate with the third plurality of UEs 171, 172. Correspondingly, the disclosed method may further comprise directly communicating, by the root BS 110, with the third plurality of UEs 171, 172. Note that the root BS 110 uses the allocated frequency resource to make communication with the third plurality of UEs 171, 172.

The combination of the root BS 110 and the plurality of non-root BS's 121-126 for serving the first plurality of UEs 171-188 provides the following advantage. Some of the non-root BS's 121-126 may be put on hot spots requiring high data traffics possibly also demanding high data-rate transmission. Because of close proximity between a non-root BS and its reachable UEs, high data-rate transmission is supportable without a need to use high power in transmission, thereby reducing interference to the neighborhood of the non-root BS. The net result is that some of the non-root BS's 121-126 provide communication capacity to these hot spots while the root BS 110 overlays the plurality of non-root BS's 121-126 for providing data communication over a larger area. The overall capacity of the RCN 100 is thereby increased.

In the RCN 100, the BS's 110, 121-126 are configured to perform similar communication processes except that the root BS 110 does not need to communicate with its parent BS, which is non-existent. Without loss of generality, consider the non-root BS 122 as a representative non-root BS for illustrating the plurality of non-root BS's 121-126. Note that the non-root BS 122 has the second plurality of UEs 176-179. The RCN 100 uses the allocated frequency resource in the following way. A first plurality of frequency spectra in the frequency resource is used for making uplink communication for the first plurality of UEs 171-188. A second plurality of frequency spectra in the frequency resource is used for making downlink communication with the first plurality of UEs 171-188. The first and second pluralities of frequency spectra may be identical (e.g., when TDD is used for uplink and downlink communications) or may be different. If the first and second pluralities of frequency spectra are different, the two frequency-spectrum pluralities are often non-overlapping (e.g., when FDD is used for uplink and downlink communications).

Figure 4:
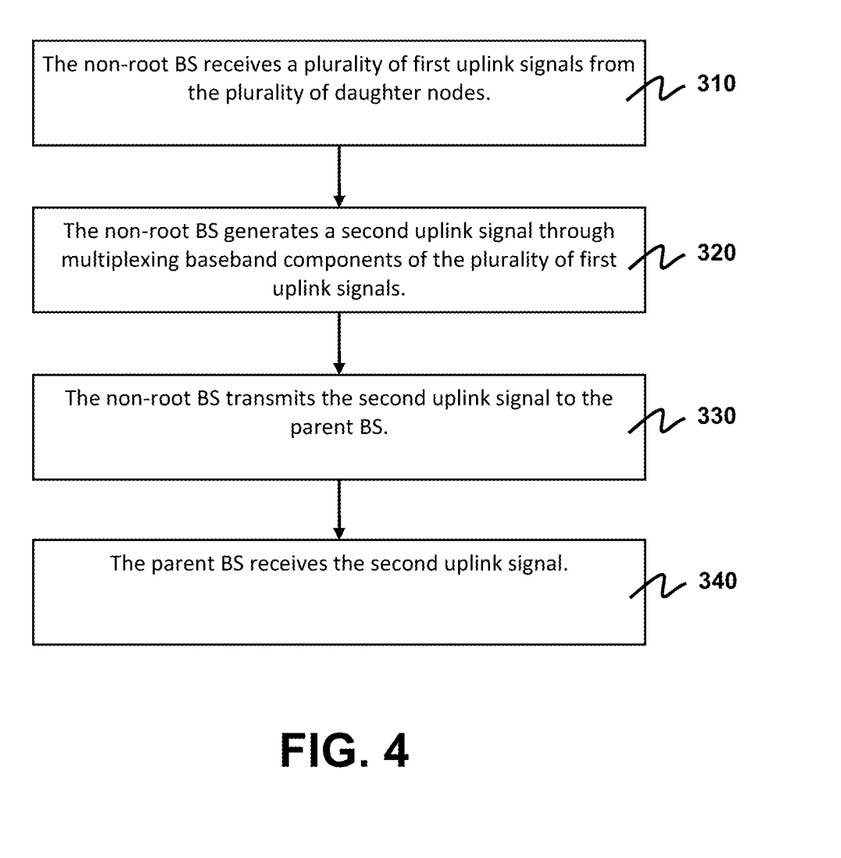
FIG. 4 depicts an exemplary uplink-communication process performed by a non-root BS in the RCN, where the process includes receiving uplink signals from a second plurality of UEs selected from the first plurality of UEs and forwarding the received uplink signals to a parent BS of the non-root BS.

FIG. 4 depicts an exemplary uplink-communication process for sending uplink signals from the second plurality of UEs 176-179 to the parent BS 121 via the non-root BS 122. The non-root BS 122 has the plurality of daughter nodes 124, 125, 176-179.

In a step 310, the non-root BS 122 receives a plurality of first uplink signals 151-154, 161-162 from the plurality of daughter nodes 124, 125, 176-179.

In a step 320, the non-root BS 122 generates a second uplink signal 141. A baseband component of the second uplink signal 141 is formed by multiplexing baseband components of the plurality of first uplink signals 151-154, 161-162. Since the last-mentioned baseband components rather than payload data carried therein are used in the multiplexing, it allows the second uplink signal 141 to be generated without a need to decode the payload data therein. Advantageously, it reduces an implementation cost of the non-root BS 122.

After the second uplink signal 141 is generated, the non-root BS 122 transmits the second uplink signal 141 to the parent BS 121 in a step 330. The second uplink signal 141 is received by the parent BS 121 in a step 340.

Figure 5:
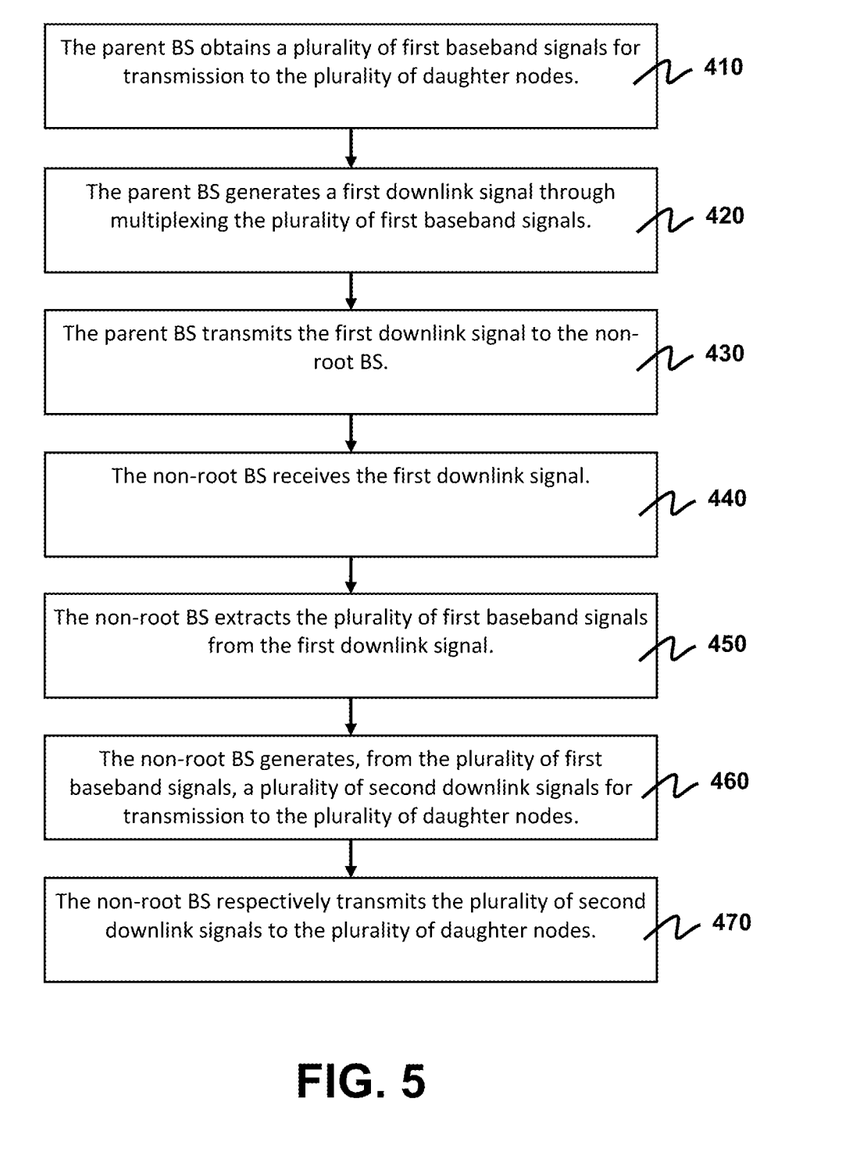
FIG. 5 depicts an exemplary downlink-communication process for distributing downlink signals from the parent BS to the second plurality of UEs via the non-root BS.

FIG. 5 depicts an exemplary downlink-communication process for distributing downlink signals from the parent BS 121 to the plurality of daughter nodes 124, 125, 176-179 via the non-root BS 122.

In a step 410, the parent BS 121 obtains a plurality of first baseband signals for transmission to the plurality of daughter nodes 124, 125, 176-179. In one scenario, downlink baseband signals for the first plurality of UEs 171-188 are all generated at the root BS 110 according to user data for transmission to the first plurality of UEs 171-188 are received from the CN 105. In another scenario, generation of the downlink baseband signals is carried out in the CN 105 (or in a computing cloud or the Internet).

In a step 420, the parent BS 121 generates a first downlink signal 142. In particular, a baseband component of the first downlink signal 142 is obtained by multiplexing the plurality of first baseband signals. Since payload data carried by the plurality of first baseband signals are not explicitly involved in carrying out the multiplexing process, it allows the first downlink signal 142 to be generated without a need to decode the payload data therein. It simplifies the design of the parent BS 121.

The parent BS 121 transmits the first downlink signal 142 to the non-root BS 122 in a step 430.

In a step 440, the non-root BS 122 receives the first downlink signal 142. The non-root BS 122 extracts the plurality of first baseband signals from the first downlink signal 142 in a step 450.

In a step 460, the non-root BS 122 generates a plurality of second downlink signals 155-158, 165-166 for transmission to the plurality of daughter nodes 124, 125, 176-179. A corresponding second downlink signal for transmission to an individual daughter node (for example, the second downlink signal 155 for transmission to the UE 176) has a baseband component that is a corresponding first baseband signal for the individual daughter node. It thereby allows the corresponding second downlink signal to be generated without a need to decode payload data therein for reducing the implementation cost of the non-root BS 122.

The non-root BS 122 transmits the corresponding second downlink signal to the individual daughter node in a step 470. As an example, the second downlink signals 155, 156, 157, 158, 165, 166 are transmitted to the UEs 176, 177, 178, 179 and the non-root BS's 124, 125, respectively.

In the steps 320 and 420, multiplexing is involved. In one embodiment, FDM is used to multiplex baseband components of the plurality of first uplink signals 151-154, 161-162 and to multiplex the plurality of first baseband signals. In the step 320, the non-root BS 122 generates the second uplink signal 141 by frequency-translating the plurality of first uplink signals 151-154, 161-162 without decoding the payload data therein. It simplifies the design of the non-root BS 122, further reducing the implementation cost of the non-root BS 122. In the step 420, similarly, the parent BS 121 generates the first downlink signal 142 by frequency-translating the plurality of first baseband signals without decoding the payload data therein. The design of the parent BS 121 is thus simplified, reducing the implementation cost of the parent BS 121. In another embodiment, TDM is used to multiplex baseband components of the plurality of first uplink signals 151-154, 161-162 in the step 320 and to multiplex the plurality of first baseband signals in the step 420. In the step 320, the baseband components of the plurality of first uplink signals 151-154, 161-162 are sampled in the time domain and time-division multiplexed, followed by pulse shaping the time-division multiplexed samples. Similar operations are applied to the step 420.

As mentioned above, a conventional approach of setting up the RCN 100 is to equip all the BS's 110, 121-126 with the same configuration of supporting UE communication over the plurality of frequency spectra of the allocated frequency resource, but it is possible that different sets of BS's in the RCN 100 use different frequency spectra for communication with UEs. Different communication standards may be used for signals on the different frequency spectra. For instance, in 5G communication, there are low-band 5G, mid-band 5G and millimeter wave 5G, each of which has a different set of timing parameters, thus effectively constituting three communication standards. The use of frequency translation in generating one signal from another signal in the steps 320 and 460 enables an individual BS to be installed with a baseband-processing facility only for the frequency spectrum that is actually assigned to the individual BS, as elaborated as follows.

Consider that the first portion of the frequency resource is used for communicating between the individual non-root BS and its second plurality of UEs. In the step 310, the non-root BS 122 receives the plurality of first uplink signals 151-154, 161-162 from the plurality of daughter nodes 124, 125, 176-179. Denote that an individual first uplink signal has a first carrier frequency. As an example, the uplink signal 151 generated from the UE 176 has its first carrier frequency in the first frequency-resource portion whereas the uplink signal 161 generated from the non-root BS 124 has its first carrier frequency not limited to be within the first frequency-resource portion. In the step 320, the non-root BS 122 generates the second uplink signal 141 for transmission to the parent BS 121. Denote that the second uplink signal 141 has a second carrier frequency. Furthermore, the second uplink signal 141 is formed by frequency-translating the individual first uplink signals and aggregating the frequency-translated plurality of first uplink signals (i.e. the plurality of first uplink signals after frequency translation). Respective frequency-translated first uplink signals are aggregated in the frequency domain, resulting in spectrum aggregation. In the step 440, the non-root BS 122 receives the first downlink signal 142. Denote that the first downlink signal 142 has a third carrier frequency. In the step 460, the non-root BS 122 generates the plurality of second downlink signals 155-158, 165-166 for transmission to the plurality of daughter nodes 124, 125, 176-179 by deaggregating the first downlink signal 142. In particular, the corresponding second downlink signal for transmission to the individual daughter node (for example, the second downlink signal 155 for transmission to the UE 176, or the second downlink signal 165 to the non-root BS 124) is generated by frequency-translating the first downlink signal 142 to a fourth carrier frequency of the corresponding second downlink signal followed by filtering to keep the desired baseband component intended for transmission to the individual daughter node. As a result, the first downlink signal 142 is deaggregated in the frequency domain to generate the plurality of second downlink signals 155-158, 165-166. That is, the plurality of second downlink signals 155-158, 165-166 is generated by spectrum deaggregation of the first downlink signal 142. By using frequency translation to obtain the second uplink signal 141 and the corresponding second downlink signal respectively from the plurality of first uplink signals 151-154, 161-162 and the first downlink signal 142, there is no need to involve baseband components carried in the plurality of first uplink signals 151-154, 161-162 and in the first downlink signal 142. As such, the non-root BS 122 is only required to install with a first baseband-processing facility compliant to a first communication standard used for communication with any UE over the first portion of the frequency resource. The use of frequency translation avoids a need for the non-root BS 122 to install with a second baseband-processing facility compliant to a second communication standard used for communication with any UE over a second portion of the frequency resource not overlapping with the first frequency-resource portion even if the first, second, third or fourth carrier frequency is outside the first frequency-resource portion. Thereby, an implementation cost of the BS 122 during setting up the RCN 100 is reduced.

Furthermore, the use of frequency translation provides increased freedom to a mobile operator in selecting at least the second and third carrier frequencies from the frequency resource during operating the RCN 100. Since the aggregation of different signals is performed in the frequency domain, each of the second uplink signal 141 and the first downlink signal 142 is a multicarrier signal having a plurality of subcarrier signals. The frequency spectrum of the multicarrier signal may be contiguous or non-contiguous. One advantage of having a non-contiguous frequency spectrum is that one part of the multicarrier carrier is transmitted on one frequency band (e.g., on the frequency band of mid-band 5G) while another part thereof is transmitted on another frequency band (e.g., on the frequency band of millimeter wave 5G). By having the frequency spectrum of the multicarrier signal to be selectable to be contiguous or non-contiguous, flexibility in spectrum usage is offered to the mobile operator, enabling more efficient use of the frequency resource.

In the RCN 100, each parent BS is configured to execute the steps 340, 410, 420 and 430 adapted for the parent BS under consideration. Each of the non-root BS's 121-126 is configured to execute the steps 310, 320, 330, 440, 450, 460 and 470 adapted for the non-root BS under consideration. Note that the root BS 110 is also the parent BS of the non-root BS's 121, 126.

The disclosed method may further include the steps 340, 410, 420 and 430 for execution by each parent BS, and the steps 310, 320, 330, 440, 450, 460 and 470 adapted for each of the non-root BS's 121-126.

Figure 6:
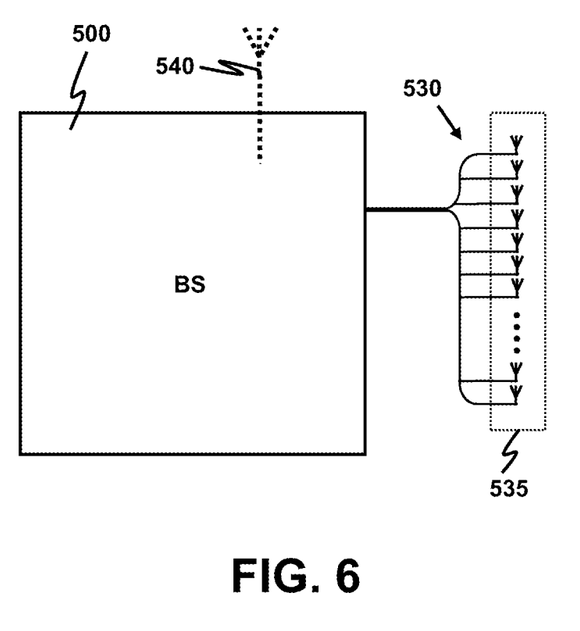
FIG. 6 is a schematic diagram of a structure of an individual BS in accordance with certain embodiments of the present disclosure.

FIG. 6 is a schematic diagram for exemplarily illustrating a structure of a BS 500 in the plurality of BS's 110, 121-126 in accordance with certain embodiments of the present disclosure. The BS 500 comprises an antenna array 530, which includes multiple antenna elements 535, for performing adaptive beamforming. The antenna array 530 may be realized as a phased array antenna. The antenna array 530 is advantageously used to receive an uplink signal from and transmit a downlink signal to an individual daughter node in the plurality of daughter nodes communicated with the BS 500. For illustration, consider a specific case that the BS 122 is implemented with the structure of the BS 500 and that the BS 122 receives the uplink signal 151 from the UE 176. The BS 122 has the plurality of daughter nodes 124, 125, 176-179. During receiving the uplink signal 151 from the UE 176, preferably the BS 122 configures the antenna array 530 of the BS 122 to point to an arrival direction of the uplink signal 151. The arrival direction is determinable by the antenna array 530 by, e.g., scanning a surrounding environment of the BS 122. Similar pointing operations are used in receiving uplink signals from other daughter nodes 124, 125, 177-179. It thereby allows spatial multiplexing of respective uplink signals 151-154, 161, 162 generated by the plurality of daughter nodes 124, 125, 176-179 to be achieved for enhancing a data-traffic capacity supportable by the BS 122. Consider that the BS 122 transmits the downlink signal 155 to the UE 176. During transmitting the downlink signal 155 to the UE 176, preferably the BS 122 configures the antenna array 530 to point to the arrival direction of the uplink signal 151 so as to reduce interference made to another daughter node neighboring to the UE 176.

Optionally, the BS 500 further comprises an additional antenna 540 for communicating with a corresponding parent BS communicated with the BS 500. Preferably, the additional antenna 540 is a high-gain directional antenna.

Although FIG. 2 depicts that the RCN 100 has only six non-root BS's 121-126 as an example case for illustrating the disclosed RCN and disclosed method, the present disclosure is not limited to using only this number of non-root BS's. In the present disclosure, any number of non-root BS's as deemed appropriate by those skilled in the art may be included in the disclosed RCN.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A radio communication network (RCN) for connecting a core network (CN) to a first plurality of user equipments (UEs), the RCN being allocated with a frequency resource consisting of a plurality of frequency spectra used for communication with the first plurality of UEs, the RCN comprising:
   a plurality of base stations (BS's) for communicating with the first plurality of UEs, respective BS's in the plurality of BS's being networked in a tree topology with a root BS selected from the plurality of BS's, the plurality of BS's being partitioned into the root BS and a plurality of non-root BS's, the root BS being connected to a wired backhaul link for connecting to the CN, an individual non-root BS being used for communicating with a second plurality of UEs reachable by the individual non-root BS, the second plurality of UEs being selected from the first plurality of UEs, wherein:
      the individual non-root BS is wirelessly communicable with the root BS directly, or indirectly via a route including at least one other non-root BS in between, to enable the second plurality of UEs to connect to the CN, allowing the first plurality of UEs to access the CN and vice versa through communicating with the plurality of BS's and utilizing the wired backhaul link without a first burden of installing plural independent wired backhaul links at all respective BS's in the plurality of BS's, thereby reducing a time taken in constructing the RCN before operating the RCN; and
      the plurality of BS's is configured such that uplink data traffics generated from the first plurality of UEs for delivering to the CN are aggregated at the root BS for transmission on the wired backhaul link and such that downlink data traffics sent from the CN for delivering to the first plurality of UEs are received at the root BS before distribution to the first plurality of UEs, allowing a data-traffic capacity provided by the wired backhaul link to be less than a sum of individual capacities that are respectively estimated for the independent wired backhaul links;
   wherein:
   the frequency resource is reused in inter-BS communication, avoiding a second burden of acquiring an additional frequency resource before operating the RCN, whereby avoidance of the first and second burdens altogether enables faster roll-out of communication services provided by the RCN;
   the individual non-root BS has a parent BS and a plurality of daughter nodes, the plurality of daughter nodes being formed by augmenting the second plurality of UEs and an entirety of any daughter BS, wherein in the tree topology, an individual daughter BS is connected to the individual non-root BS and is farther away from the root BS than the individual non-root BS is, and wherein in the tree topology, the parent BS is connected to the individual non-root BS and is nearer to the root BS than the individual non-root BS is;
   a first portion of the frequency resource is used for communicating between the individual non-root BS and the second plurality of UEs; and
   a second portion of the frequency resource not overlapping with the first portion thereof is used for communicating between the individual non-root BS and the entirety of any daughter BS or between the individual non-root BS and the parent BS, thereby reusing a part of frequency resource not used in communication between the individual non-root BS and the second plurality of UEs for enhancing an overall capacity supportable by the individual non-root BS while supporting faster roll-out of the communication services.

2. The RCN of claim 1, wherein:
   the individual non-root BS is configured to:
      receive a plurality of first uplink signals from the plurality of daughter nodes, an individual first uplink signal having a first carrier frequency;
      generate a second uplink signal having a second carrier frequency for transmission to the parent BS by frequency-translating the individual first uplink signal and aggregating the plurality of first uplink signals after frequency translation;
      receive a first downlink signal from the parent BS, the first downlink signal having a third carrier frequency, wherein a baseband component of the first downlink signal is obtained by multiplexing the plurality of first baseband signals; and
      generate a plurality of second downlink signals for transmission to the plurality of daughter nodes by deaggregating the first downlink signal, wherein a corresponding second downlink signal for transmission to the individual daughter node is generated by frequency-translating the first downlink signal to a fourth carrier frequency of the corresponding second downlink signal followed by filtering; and
   the individual non-root BS is installed with a first baseband-processing facility compliant to a first communication standard used for communication with any UE over the first portion of the frequency resource, whereby using frequency translation in generating the second uplink signal and the corresponding second downlink signal avoids a need for the individual non-root BS to install with a second baseband-processing facility compliant to a second communication standard used for communication with any UE over any portion of the frequency resource not overlapping with the first portion thereof even if the first, second, third or fourth carrier frequency is outside the first portion of the frequency resource.

3. The RCN of claim 2, wherein the second uplink signal is generated as a multicarrier signal having a frequency spectrum selectable to be contiguous or non-contiguous for enabling the frequency resource to be more efficiently used.

4. The RCN of claim 1, wherein:
   the individual non-root BS is located in the RCN at a geographical location selected such that a propagation characteristic of a radio channel between the individual non-root BS and an individual UE in the second plurality of UEs favors the first portion of the frequency resource over the second portion thereof.

5. The RCN of claim 1, wherein:
   the individual non-root BS is configured to:
      receive a plurality of first uplink signals from the plurality of daughter nodes;
      generate a second uplink signal, wherein a baseband component of the second uplink signal is formed by multiplexing baseband components of the plurality of first uplink signals, thereby allowing the second uplink signal to be generated without a need to decode payload data therein for reducing an implementation cost of the individual non-root BS;
      transmit the second uplink signal to the parent BS;
   the parent BS is configured to:
      obtain a plurality of first baseband signals for transmission to the plurality of daughter nodes;

generate a first downlink signal, wherein a baseband component of the first downlink signal is obtained by multiplexing the plurality of first baseband signals; and transmit the first downlink signal to the individual non-root BS; and the individual non-root BS is further configured to:

receive the first downlink signal;

extract the plurality of first baseband signals from the first downlink signal;

generate a plurality of second downlink signals for transmission to the plurality of daughter nodes, wherein a corresponding second downlink signal for transmission to the individual daughter node has a baseband component that is a corresponding first baseband signal for transmission to the individual daughter node, thereby allowing the corresponding second downlink signal to be generated without a need to decode payload data therein for reducing the implementation cost of the individual non-root BS; and transmit the corresponding second downlink signal to the individual daughter node.

6. The RCN of claim 1, wherein:

an individual BS in the plurality of BS's comprises an antenna array for adaptive beamforming; and the individual BS is configured to:

during receiving an uplink signal from an individual daughter node in a corresponding plurality of daughter nodes communicated with the individual BS, configure the antenna array to point to an arrival direction of the uplink signal, thereby allowing spatial multiplexing of respective uplink signals generated by the corresponding plurality of daughter nodes to be achieved for enhancing a data-traffic capacity supportable by the individual BS; and during transmitting a downlink signal to the individual daughter node, configure the antenna array to point to the arrival direction of the uplink signal for reducing interference made to another daughter node neighboring to the individual daughter node.

7. The RCN of claim 6, wherein:

the individual non-root BS further comprises a directional antenna for communication with a corresponding parent BS communicated with the individual non-root BS.

8. A method for setting up and operating a radio communication network (RCN) used for connecting a core network (CN) to a first plurality of user equipments (UEs), the RCN being allocated with a frequency resource consisting of a plurality of frequency spectra used for communication with the first plurality of UEs, the RCN comprising a plurality of base stations (BS's) for communicating with the first plurality of UEs, the method comprising:

arranging respective BS's in the plurality of BS's to network in a tree topology with a root BS selected from the plurality of BS's, the plurality of BS's being partitioned into the root BS and a plurality of non-root BS's;

connecting the root BS to a wired backhaul link that connects to the CN;

using an individual non-root BS to communicate with a second plurality of UEs reachable by the individual non-root BS, the second plurality of UEs being selected from the first plurality of UEs, wherein the individual non-root BS has a parent BS and a plurality of daughter nodes, the plurality of daughter nodes being formed by augmenting the second plurality of UEs and an entirety of any daughter BS, wherein in the tree topology, an individual daughter BS is connected to the individual non-root BS and is farther away from the root BS than the individual non-root BS is, and wherein in the tree topology, the parent BS is connected to the individual non-root BS and is nearer to the root BS than the individual non-root BS is;

configuring the individual non-root BS to wirelessly communicate with the root BS directly, or indirectly via a route including at least one other non-root BS in between, to enable the second plurality of UEs to connect to the CN such that the first plurality of UEs is allowed to access the CN and vice versa through communicating with the plurality of BS's and utilizing the wired backhaul link without a first burden of installing plural independent wired backhaul links at all respective BS's in the plurality of BS's, thereby reducing a time taken in constructing the RCN before operating the RCN;

configuring the plurality of BS's such that uplink data traffics generated from the first plurality of UEs for delivering to the CN are aggregated at the root BS for transmission on the wired backhaul link and such that downlink data traffics sent from the CN for delivering to the first plurality of UEs are received at the root BS before distribution to the first plurality of UEs, allowing a data-traffic capacity provided by the wired backhaul link to be less than a sum of individual capacities that are respectively estimated for the independent wired backhaul links;

reusing the frequency resource in inter-BS communication to avoid a second burden of acquiring an additional frequency resource before operating the RCN, whereby avoidance of the first and second burdens altogether enables faster roll-out of communication services provided by the RCN;

using a first portion of the frequency resource for communicating between the individual non-root BS and the second plurality of UEs; and using a second portion of the frequency resource not overlapping with the first portion thereof for communicating between the individual non-root BS and the entirety of any daughter BS or between the individual non-root BS and the parent BS, thereby reusing a part of frequency resource not used in communication between the individual non-root BS and the second plurality of UEs for enhancing an overall capacity supportable by the individual non-root BS while supporting faster roll-out of the communication services.

9. The method of claim 8 further comprising:

receiving, by the individual non-root BS, a plurality of first uplink signals from the plurality of daughter nodes wherein an individual first uplink signal has a first carrier frequency;

generating, by the individual non-root BS, a second uplink signal having a second carrier frequency for transmission to the parent BS by frequency-translating the individual first uplink signal and aggregating the plurality of first uplink signals after frequency translation;

receiving, by the individual non-root BS, a first downlink signal from the parent BS, the first downlink signal having a third carrier frequency, wherein a baseband component of the first downlink signal is obtained by multiplexing the plurality of first baseband signals;

generating, by the individual non-root BS, a plurality of second downlink signals for transmission to the plurality of daughter nodes by deaggregating the first downlink signal, wherein a corresponding second downlink signal for transmission to the individual daughter node is generated by frequency-translating the first downlink signal to a fourth carrier frequency of the corresponding second downlink signal followed by filtering; and installing the individual non-root BS with a first baseband-processing facility compliant to a first communication standard used for communication with any UE over the first portion of the frequency resource, whereby using frequency translation in generating the second uplink signal and the corresponding second downlink signal avoids a need for the individual non-root BS to install with a second baseband-processing facility compliant to a second communication standard used for communication with any UE over any portion of the frequency resource not overlapping with the first portion thereof even if the first, second, third or fourth carrier frequency is outside the first portion of the frequency resource.

10. The method of claim 9, wherein the second uplink signal is generated as a multicarrier signal having a frequency spectrum selectable to be contiguous or non-contiguous for enabling the frequency resource to be more efficiently used.

11. The method of claim 8 further comprising:
locating the individual non-root BS in the RCN at a geographical location selected such that a propagation characteristic of a radio channel between the individual non-root BS and an individual UE in the second plurality of UEs favors the first portion of the frequency resource over the second portion thereof.

12. The method of claim 8 further comprising:
during receiving an uplink signal from an individual daughter node in a corresponding plurality of daughter nodes communicated with the individual BS, configuring, by the individual BS, an antenna array of the individual BS to point to an arrival direction of the uplink signal, thereby allowing spatial multiplexing of respective uplink signals generated by the corresponding plurality of daughter nodes to be achieved for enhancing a data-traffic capacity supportable by the individual BS; and during transmitting a downlink signal to the individual daughter node, configuring, by the individual BS, the antenna array to point to the arrival direction of the uplink signal for reducing interference made to another daughter node neighboring to the individual daughter node.

13. The method of claim 8 further comprising:
receiving, by the individual non-root BS, a plurality of first uplink signals from the plurality of daughter nodes;

generating, by the individual non-root BS, a second uplink signal, wherein a baseband component of the second uplink signal is formed by multiplexing baseband components of the plurality of first uplink signals, thereby allowing the second uplink signal to be generated without a need to decode payload data therein for reducing an implementation cost of the individual non-root BS;

transmitting, by the individual non-root BS, the second uplink signal to the parent BS;

obtaining, by the parent BS, a plurality of first baseband signals for transmission to the plurality of daughter nodes;

generating, by the parent BS, a first downlink signal, wherein a baseband component of the first downlink signal is obtained by multiplexing the plurality of first baseband signals;

transmitting, by the parent BS, the first downlink signal to the individual non-root BS;

receiving, by the individual non-root BS, the first downlink signal;

extracting, by the individual non-root BS, the plurality of first baseband signals from the first downlink signal;

generating, by the individual non-root BS, a plurality of second downlink signals for transmission to the plurality of daughter nodes, wherein a corresponding second downlink signal for transmission to the individual daughter node has a baseband component that is a corresponding first baseband signal for transmission to the individual daughter node, thereby allowing the corresponding second downlink signal to be generated without a need to decode payload data therein for reducing the implementation cost of the individual non-root BS; and transmitting, by the individual non-root BS, the corresponding second downlink signal to the individual daughter node.

* * * * *